United States Patent
Keohane et al.

(10) Patent No.: US 10,318,094 B2
(45) Date of Patent: Jun. 11, 2019

(54) ASSISTIVE TECHNOLOGY (AT) RESPONSIVE TO COGNITIVE STATES

(71) Applicant: International Business Machines Corporation, Armonk, NY (US)

(72) Inventors: Susann Marie Keohane, Austin, TX (US); Maureen Elizabeth Kraft, Hudson, MA (US); Holly Lee Nielsen, San Jose, CA (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 845 days.

(21) Appl. No.: 14/668,943

(22) Filed: Mar. 25, 2015

(65) Prior Publication Data
US 2016/0283846 A1    Sep. 29, 2016

(51) Int. Cl.
| | | |
|---|---|---|
| *G06F 17/27* | (2006.01) | |
| *G06F 9/451* | (2018.01) | |
| *G06F 3/0481* | (2013.01) | |
| *G06F 3/0484* | (2013.01) | |

(52) U.S. Cl.
CPC ........ *G06F 3/0481* (2013.01); *G06F 3/04847* (2013.01); *G06F 9/453* (2018.02); *G06F 17/2785* (2013.01)

(58) Field of Classification Search
CPC ...... G06F 3/167; G06F 9/4446; G09B 21/006
See application file for complete search history.

(56) References Cited

U.S. PATENT DOCUMENTS

| | | | | |
|---|---|---|---|---|
| 6,064,381 A | * | 5/2000 | Harel ............... | G06F 9/4446 434/118 |
| 6,118,447 A | * | 9/2000 | Harel ............... | G06F 9/4446 717/131 |
| 7,594,176 B1 | * | 9/2009 | English ............ | G06F 9/4446 706/50 |
| 7,752,563 B2 | | 7/2010 | Ice et al. | |
| 8,468,445 B2 | | 6/2013 | Gupta et al. | |
| 8,619,272 B2 | | 12/2013 | Seabright et al. | |

(Continued)

OTHER PUBLICATIONS

Thomas E. Hutchinson et al., "Human-Computer Interaction Using Eye-Gaze Input," IEEE Transactions on Systems, Man, and Cybernetics, vol. 19, No. 6, pp. 1527-1534, Dec. 1989.

(Continued)

*Primary Examiner* — William Spieler
(74) *Attorney, Agent, or Firm* — Rahan Uddin; Otterstedt, Ellenbogen & Kammer, LLP.

(57) ABSTRACT

A method of providing guidance in connection with a technological task includes determining, from an interaction of an end user with a computer system, a current context and task of the end user, identifying a change in a cognitive state of the end user, where the change in the cognitive state is associated with performance of the task using the computer system, searching a plurality of user experiences corresponding to the change in the cognitive state of the end user and the user's current context, selecting at least one of the user experiences according to a selection parameter for determining a selected user experience, and injecting the selected user experience into the current context of the end user via an output device of the computer system.

10 Claims, 5 Drawing Sheets

(56) References Cited

U.S. PATENT DOCUMENTS

| | | | |
|---|---|---|---|
| 2004/0162890 A1* | 8/2004 | Ohta | G06F 9/4446 709/218 |
| 2005/0230592 A1 | 10/2005 | Tillinghast et al. | |
| 2005/0266866 A1* | 12/2005 | Ahya | G06F 9/4446 455/502 |
| 2006/0115799 A1* | 6/2006 | Stephen | G09B 15/06 434/185 |
| 2007/0130510 A1 | 6/2007 | Dharamshi et al. | |
| 2009/0327184 A1* | 12/2009 | Nishizaki | G06F 3/0482 706/46 |
| 2010/0100869 A1 | 4/2010 | Fresko et al. | |
| 2011/0119289 A1 | 5/2011 | Gregory | |
| 2012/0084075 A1* | 4/2012 | Yamada | G06F 3/0236 704/9 |
| 2013/0104029 A1 | 4/2013 | Hendry et al. | |
| 2014/0245277 A1 | 8/2014 | Petro et al. | |
| 2014/0280296 A1* | 9/2014 | Johnston | G06F 17/30011 707/769 |
| 2014/0365068 A1* | 12/2014 | Burns | G10L 13/033 701/31.5 |
| 2015/0356142 A1* | 12/2015 | Proux | G06F 17/30663 706/11 |
| 2015/0378985 A1* | 12/2015 | Prasad | G06F 17/2785 704/9 |
| 2017/0024228 A1* | 1/2017 | Chen | G06F 3/0484 |

OTHER PUBLICATIONS

Hisashi Miyashita et al., "Making Multimedia Content Accessible for Screen Reader Users", W4A2007—Challenge, Banff, Canada. Co-Located with the 16th International World Wide Web Conference, pp. 1-2, May 2007.

Carson Jonathan Reynolds, "The Sensing and Measurement of Frustration with Computers," Massachusetts Institute of Technology, May 2001.

Holly Lee Nielsen et al., unpublished U.S. Appl. No. 14/986,570, filed Dec. 31, 2015, Assistive Technology (AT) Responsive to Cognitive States, pp. 1-21 and 5 sheets of drawings.

List of IBM Patents or Patent Applications.

* cited by examiner

ASSISTIVE TECHNOLOGY (AT) RESPONSIVE TO COGNITIVE STATES

BACKGROUND

The present disclosure relates to assistive technology, and more particularly to assistive technology selectively injecting information into a current context in response to a user's cognitive status.

Assistive Technology (AT) includes screen readers, speech-to-text recognition systems, and wearable and other mobile accessibility devices for people with disabilities or specialized needs.

Many applications provide instant user guidance, for example, using the F1 key to invoke a help window, context sensitive tips and the like. Applications also make use of social channels (e.g., forums, blogs or wikis) to share user experiences, for example, in a navigation application that notifies a current user of other users' experiences. The user experiences may be a solution to an issue, a tip, or any kind of assistance to solve a problem, or an instruction to complete a task. The other users' experiences are updated in real time, and may be selectively provided to the current user based on a state of the current user.

Although the shared user experience can be used by both sighted users and screen reader users, the usage scenarios or use experiences are different. Screen readers and other assistive technologies listen for alerts (i.e., role=alert in WAI-ARIA (the Web Accessibility Initiative's Accessible Rich Internet Applications specification)) or events from a current application that provide updated status and messaging information to the user, for example, when a new email arrives or a change in a status. Alerts give information about external applications that are not related to what the user is doing. However, the user must use keyboard input to get the content referenced by the alert or event leaving the context of the current application.

BRIEF SUMMARY

According to an exemplary embodiment of the present invention, a method of providing guidance in connection with a technological task includes determining, from an interaction of an end user with a computer system, a current context and task of the end user, identifying a change in a cognitive state of the end user, where the change in the cognitive state is associated with performance of the task using the computer system, searching a plurality of user experiences corresponding to the change in the cognitive state of the end user and the user's current context, selecting at least one of the user experiences according to a selection parameter for determining a selected user experience, and injecting the selected user experience into the current context of the end user via an output device of the computer system.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

Figure 1:
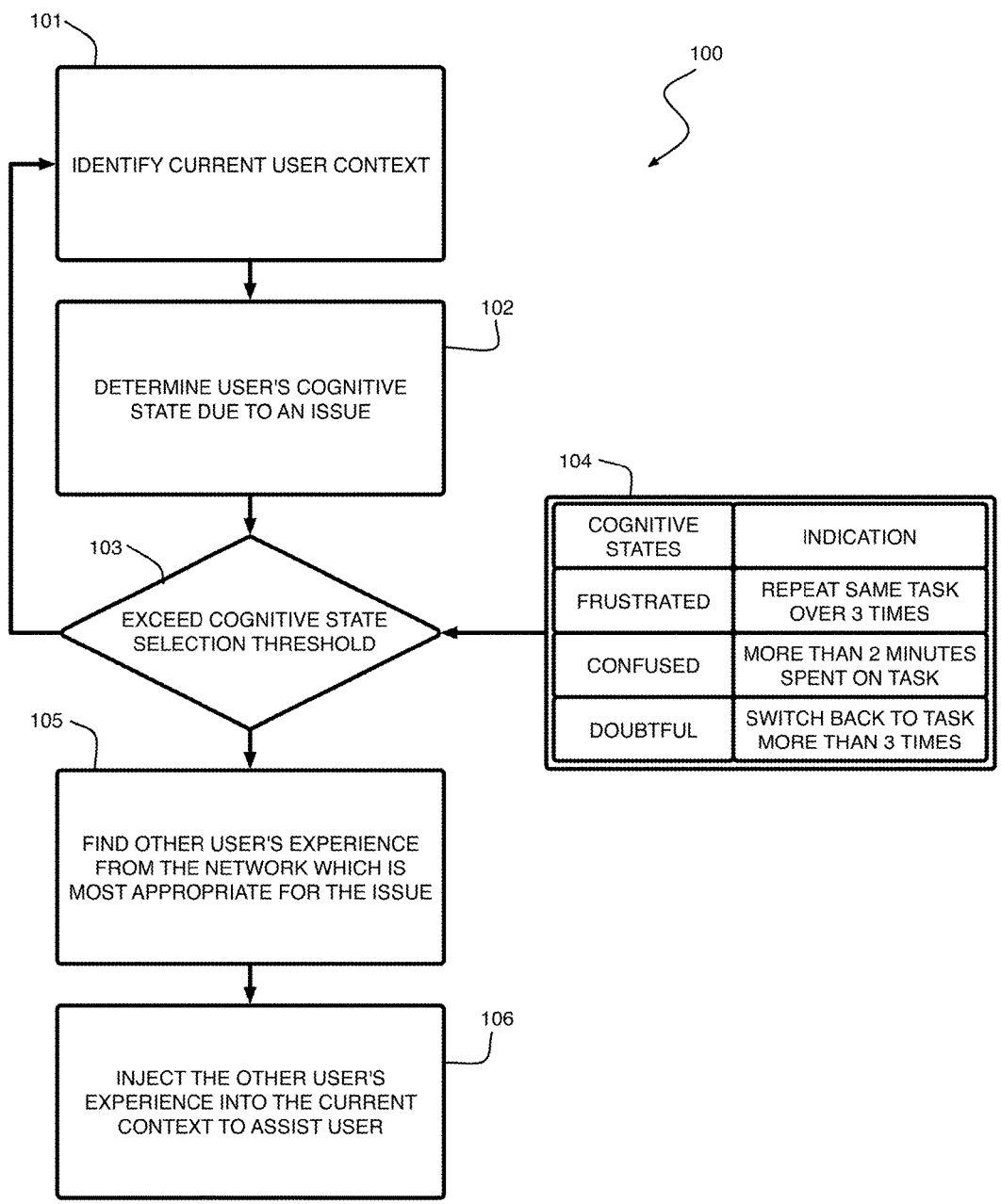
FIG. 1 is a flow diagram of a method of providing guidance in connection with a technologic task according to an exemplary embodiment of the present invention.

According to an exemplary embodiment of the present invention, a user interaction with a technological process, aided by a screen reader, is streamlined through experience sharing. In one or more embodiments of the present invention, experience sharing includes injecting other users' experiences in a current context of a user task. For example, if the screen reader identifies that the user is frustrated or confused, the screen reader searches a forum and finds a work-around using an alternative short-cut. The existing user's experience is selected from the ones that have proved to be working by user voting or ranking etc. for the same situation or context.

Herein after, embodiments of the present invention will be described in terms of an end user in a community of users.

According to an exemplary embodiment of the present invention, a technological task performed by the end user who is aided by a screen reader application or other assistive technology (AT) is augmented with information based on the end user's cognitive state. In one or more embodiments, the augmentation includes injecting a user experience into the current context (e.g., in the form of a tip, recommend key commands, or other assistance) in response to a change in the end user's cognitive state. The injected user experience can be the existing experience (of the same user, or other users) with the same or similar task gleaned from social networks, or another data source. The injected experiences can be from a current time (e.g., within the last 2-4 hours, and more generally from within the past 24 hours) or from an earlier time. According to one or more embodiments of the present invention, the experiences are stored in a database, or other store, and made available to the AT.

According to an exemplary embodiment of the present invention, the change in the cognitive state of the end user can be determined based on the end user's interaction with a current application. For example, a large amount of time spent on a single task within the application is indicative of confusion. In another example, repeated actions (e.g., key strokes) are indicative of being doubtable. In yet another example, user frustration can be determined based on repeated attempts to complete a task. In one or more embodiments of the present invention, the cognitive state of the end user is indicative of an issue. In another embodiment of the present invention, the cognitive state of the end user can be determined by a user action, for instance, pressing a pre-defined key (or key combination) by the screen reader so once the user presses the key, the screen reader knows that user needs assistance. The detection of cognitive states can be performed using currently available applications.

According to an exemplary embodiment of the present invention, an action needed to remedy the issue that the end user is experiencing is based on the cognitive stage of the end user. The action can be predefined based on the end user's preferences (e.g., disability types and extent, as well as preferred social networks and rating system).

According to an exemplary embodiment of the present invention, efficient and effective screen reader experiences can be achieved, where the end user can perform tasks successfully. Referring to FIG. 1 and according to an exemplary embodiment of the present invention, a method of providing guidance in connection with a technologic task 100 includes determining an end user's current context and activities 101. For example, the AT uses a buffer for contexts and user actions that can be used to determine one or more activities of the end user. At blocks 102 and 103, a change in the cognitive state of the end user is identified using a database of cognitive states and corresponding indications (see 104). In at least one embodiment of the present invention, the change is determined using a threshold (see block 103). Since the detection of the cognitive state is tied to the end user's interaction with the application, a change in the cognitive state is assumed to be due to an issue related to that interaction. At block 105, other user experiences are searched and filtered for the issue. One or more user experiences for the issue are selected from a social network. The selected user experience(s) can be determined based on one or more factors, for example, ranking of the users providing experiences, or ranking experiences themselves. For example, one or more workarounds are identified for a keyboard issue where a standard shortcut is not behaving as expected. Among the users who share experiences, a user's feedback, ranking, and scores can be used to select an appropriate user experience demonstrating the proposed workaround. At block 106, the selected user experience(s) is injected into the current context of the end user. This can be done by inserting the experience into the current context stream. In at least one embodiment, the insertion includes a task pause while the end user listens to instructions to complete the task. These instructions are determined from the existing user experience based on the ranking, and may be in different forms. For example, a brief instruction for advanced users and a more detailed instruction for less advanced users.

An insertion can be performed by adding text of the selected user experience into a buffer of the screen reader. In one exemplary embodiment, the inserted experience is distinguished from the current context by using a different spoken tone. The screen reader application determines when the user is frustrated (via their interaction) and queries the database for the existing experience. The screen reader application filters the information gathered from the database, ensures that it fits into the current user context and delivers the information seamlessly to the user without distracting the user from the task at hand.

It should be understood that the AT application can be implemented in various ways, including as a stand-alone application, a module of the screen reader, a plugin or the like. The AT provides assistance to the screen reader end user in determining information relevant to a current task.

Figure 2:
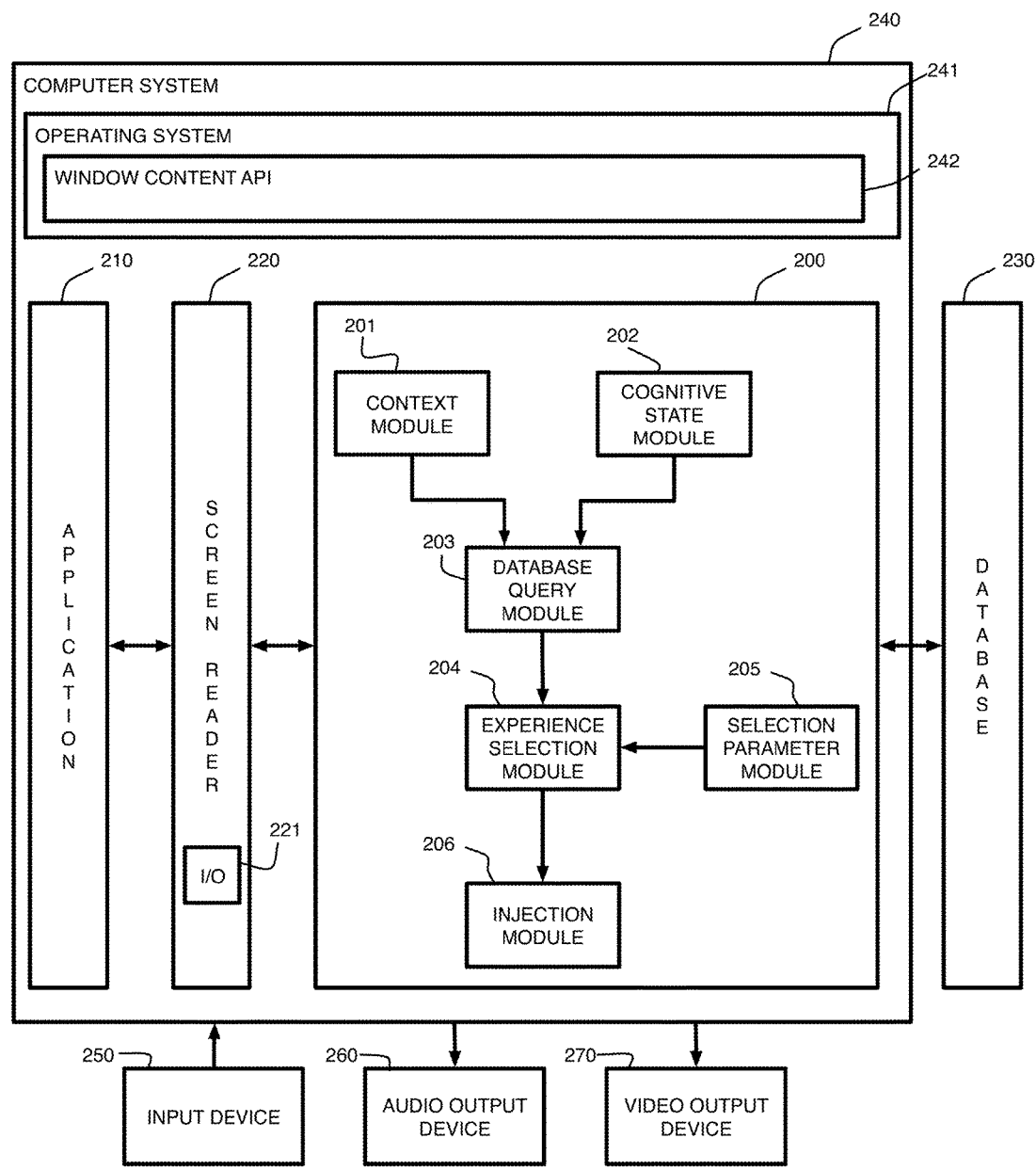
FIG. 2 is a diagram of a computer system including a screen reader and context and cognitive engine according to an exemplary embodiment of the present invention.

Illustrated in FIG. 2 are a context and cognitive engine 200, an end user application 210 (e.g., word processor, spreadsheet, programming environment, creative suite, etc.), a screen reader 220 (such as the JAWS (Job Access With Speech) screen reader, the Home Page Reader (Hpr) or Easy Web Browsing) and a database 230.

Figure 5:
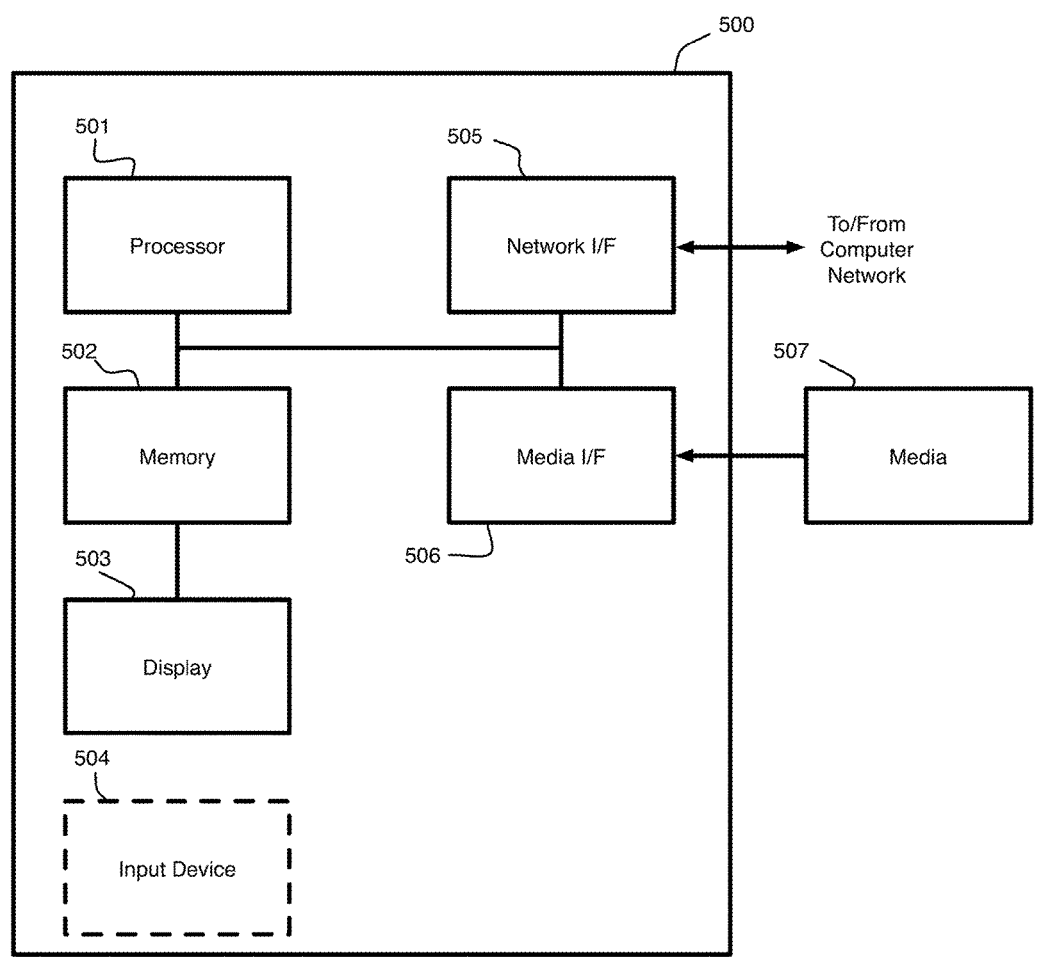
FIG. 5 is a diagram of a computer system configured to providing guidance in connection with a technologic task according to an exemplary embodiment of the present invention.

According to an exemplary embodiment of the present invention, the context and cognitive engine 200, end user application 210 and screen reader 220 are implemented in computer readable code executed by computer system 240 (see also FIG. 5). The computer system 240 executes an operating system 241 supporting the applications. The operating system 241 makes available, via a window content application programming interface (API) 242, a textual description of a window's content. Calls may be made to the window content API 242 by the screen reader 220 to gain information about the content of a window. This window content API 242 is used by a screen reader and the resulting content information is synthesized to audio output.

In one or more exemplary embodiments of the present invention, the computer system 240 is connected to an input device 250 (e.g., keyboard, pointing device, capacitive touch panel with tactile feedback, etc.), an audio output device 260 (e.g., a speaker, headphones, a cochlear implant with wireless connectivity, etc.) and a video output device 270 (e.g., display).

In view of the foregoing, when the end user interacts with the application 201 the screen reader 220 announces at least a portion of the activity related to the interaction(s) with the application 210 (e.g., announcing end user input and a context of the input such as the name of a dialog box receiving the input).

The database 230 stores experiences accessible to the context and cognitive engine 200. The database 230 can be executed by the computer system 240 or another computer system (for example, a cloud computing node including a computer system/serve, which is operational with numerous other general purpose or special purpose computing system environments or configurations). The components of computer system/server may include, but are not limited to, one or more processors or processing units, a system memory, and a bus that couples various system components including system memory to at least one of the processors.

The different applications (e.g., context and cognitive engine 200, end user application 210 and screen reader 220) can be embodied as virtual machines, plug-in's and the like. In one exemplary embodiment, the context and cognitive engine 200 and end user application 210 make use of input/output objects connected to the screen reader 220 configured as a host assistive technology input/output manager 221. The input/output manager 221 includes input and output sockets for interfacing with client applications (e.g., context and cognitive engine 200, end user application 210 and screen reader 220).

The context and cognitive engine 200 determines a current context of the end user 201, that is the context in which the end user is working. The screen reader 220 may use key words, domain, subject, or work item to determine the current context. The screen reader 220 determines that the cognitive state changes for a specific issue (e.g., from interested to frustrated) 202. Once determination of a cognitive status change, for example, to a frustrated status, the screen reader application queries a database (e.g., a social network) for the existing experiences on the issue determined by the user's current action or task with the context. 203. The screen reader 220 determines one or more appropriate user experiences 204, for example, based on ranking, hits and recommendations, and the end user's preferences (such as disability types and extent) 205. The screen reader 220 injects the determined user experience(s) into the current content stream and context, and delivers/announces to the end user 206.

According to an embodiment of the present invention, the screen reader 220 may decide to further filter the existing experience based on the current user or policies. For example, the screen reader may decide to filter out the existing experience if the experience is determined to be undesirable for consumption by the user in the current context (e.g., respecting parental controls, corporate filters and the like specified through the operative system 241). In this way, the AT can be implemented as a filter on user experiences such that only user experiences relevant to the current context and compliance with certain policies are provided to the end user.

Figure 3:
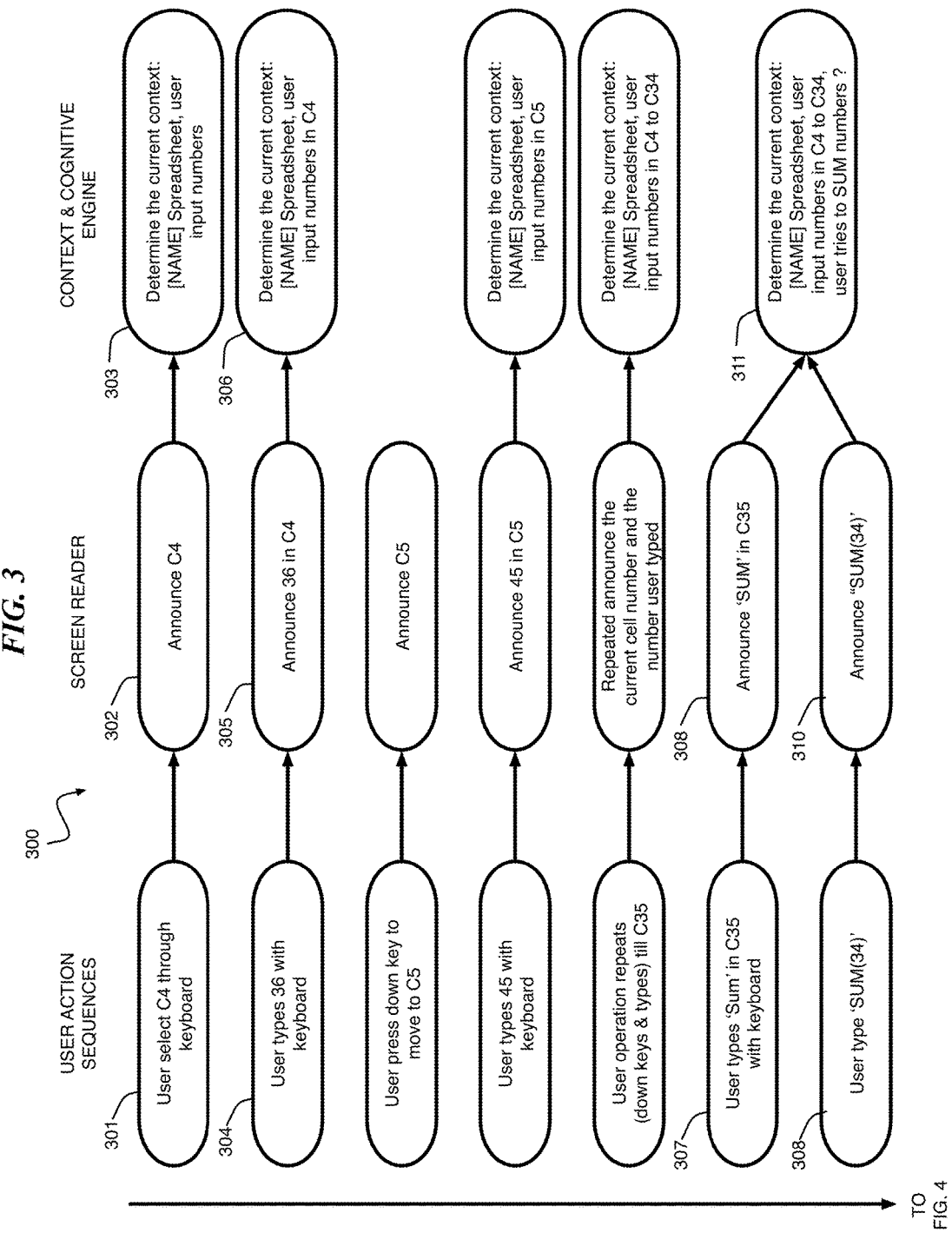
FIGS. 3-4 are a flow diagram for an end user interaction with a screen reader having a context and cognitive engine component according to an exemplary embodiment of the present invention.
Figure 4:
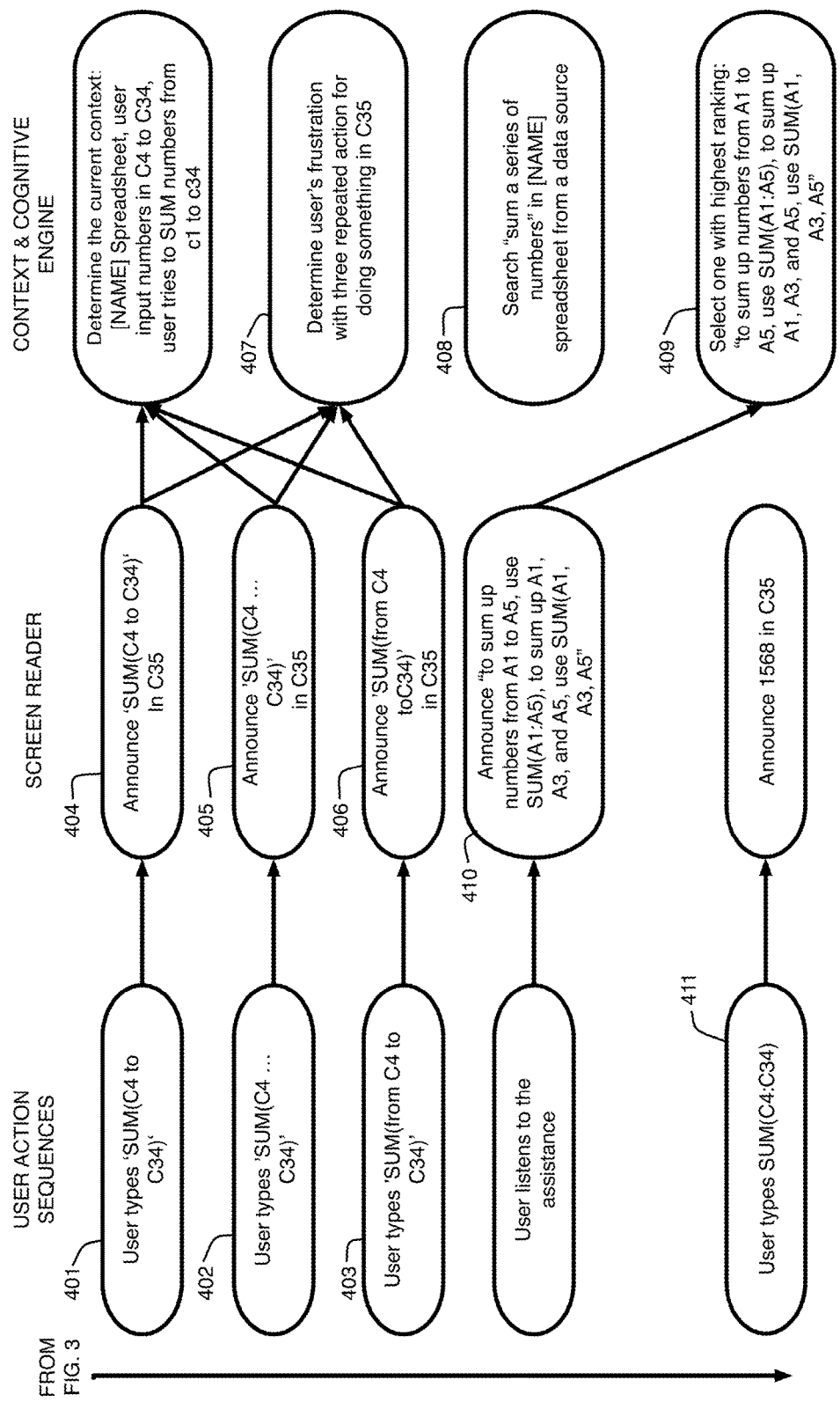

FIG. 3 and FIG. 4 show a set of user actions in the left column arranged in chronological order from top to bottom, screen reader actions in the center column and context and cognitive engine actions in the right column. The figures show end user interactions with a screen reader having a context and cognitive engine component 300 according to an exemplary embodiment of the present invention. In FIG. 3, for example, at 301 the end user selects a cell in a spreadsheet at position "C4" using keyboard inputs. At 302 the screen reader announces the selection of position "C4" At 303 the column and context and cognitive engine determines a current context, which includes a name of the spreadsheet and the user keyboard input.

At block 304, the user types "34" and at block 305 the screen reader announces "34" in cell "C4," while the context and cognitive engine determines a current context including the name of the spreadsheet and the value input into cell "C4" at block 306.

At block 307 the user inputs "SUM" in cell "C35" and at block 308 the screen reader announces "SUM" in cell "C35." At block 309 the user inputs "SUM(34)" and the screen reader announces "SUM(34)" at block 310. At block 311, the context and cognitive engine determines the current context as the name of the spreadsheet, the end user input in cells "C4" to "C34" and an apparent repeated attempts to sum the values of column "C" (at blocks 307 and 309)

In FIG. 4, the end user continues to attempt to sum column "C" at blocks 401, 402 and 403, with corresponding announcements being issued by the screen reader at blocks 404, 405 and 406. At block 407, the context and cognitive engine determines user frustration with the repeated actions at cell "C35" (e.g., at blocks 307, 308, 401, 402 and 403). At block 408, the context and cognitive engine searches for an interaction using the search phrase "sum a series of numbers" along with the name of the spreadsheet. The search is applied to a data source (e.g., a corporate data source including interaction with different documents) and returns one or more possible interactions. At block 409, the context and cognitive engine selects an interaction from among the possible interactions. At block 410, the selected interaction is injected into the end user's context, wherein the screen reader announces the assistance "to sum up numbers from A1 to A5, use SUM(A1:A5), to sum up A1, A3 and A5 use SUM(A1, A3, A5)." At block 412, the end user is able to perform the task, having had listened to the injected assistance at block 411.

According to an embodiment of the present invention, AT according to an embodiment of the present invention can be applied to additional assistive technologies, for example, speech recognition applications, a mobile application or locational system. For example, if a user is using the mobile application for navigating a campus and encounters an area where the system cannot give an accurate decision, the AT injects information to assist the user in locating a landmark such as a classroom or lecture hall. The user receives in-context information based on their given coordinates that pull experiential data, in real time, from a social network to give assistance as to where they should go. This experiential data can be filtered based on the user's disability and/or action since querying the system for the experiential data. In one example, if the user needs to take an elevator and has not yet moved to the recommended location, the system traps the experiential data for delivery at an appropriate time, reducing further user frustration.

By way of recapitulation, according to an exemplary embodiment of the present invention, a method of providing guidance in connection with a technological task includes determining, from an interaction of an end user with a computer system (see for example, 240, FIG. 2), a current context and task of the end user (see for example, 201, FIG. 2), identifying a change in a cognitive state of the end user, where the change in the cognitive state is associated with performance of the task using the computer system (see for example, 202, FIG. 2), searching a plurality of user experiences corresponding to the change in the cognitive state of the end user and the user's current context (see for example, 203, FIG. 2), selecting at least one of the user experiences according to a selection parameter for determining a selected user experience (see for example, 204, FIG. 2), and injecting the selected user experience into the current context of the end user (see for example, 206, FIG. 2) via an output device (see for example, 260, FIG. 2) of the computer system.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing an AT apparatus including a context module (e.g., 201), a cognitive state module 202, a database query module 203, an experience selection module 204 and an injection module 206. The method steps can then be carried out using the distinct software modules and/or sub-modules of the system, as described above, executing on one or more hardware processors (e.g., see 501, FIG. 5). Further, a computer program product can include a tangible computer-readable recordable storage medium with code adapted to be executed to carry out one or more method steps described herein, including the provision of the system with the distinct software modules.

Referring to FIG. 5; FIG. 5 is a block diagram depicting an exemplary computer system embodying an AT apparatus 200 (see FIG. 2) according to an embodiment of the present invention. The computer system shown in FIG. 5 includes a processor 501, memory 502, display 503, input device 504 (e.g., keyboard), a network interface (I/F) 505, a media I/F 506, and media 507, such as a signal source, e.g., camera, Hard Drive (HD), external memory device, etc.

In different applications, some of the components shown in FIG. 5 can be omitted. The whole system shown in FIG. 5 is controlled by computer readable instructions, which are generally stored in the media 507. The software can be downloaded from a network (not shown in the figures), stored in the media 507. Alternatively, software downloaded from a network can be loaded into the memory 502 and executed by the processor 501 so as to complete the function determined by the software.

The processor 501 may be configured to perform one or more methodologies described in the present disclosure, illustrative embodiments of which are shown in the above figures and described herein. Embodiments of the present invention can be implemented as a routine that is stored in memory 502 and executed by the processor 501 to process the signal from the media 507. As such, the computer system is a general-purpose computer system that becomes a specific purpose computer system when executing routines of the present disclosure.

Although the computer system described in FIG. 5 can support methods according to the present disclosure, this system is only one example of a computer system. Those skilled of the art should understand that other computer system designs can be used to implement embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for providing guidance in connection with a technological task, the computer program product comprising a computer readable storage medium having program instructions embodied therewith, the program instructions executable by a processor to cause the processor to:
    execute a first application;
    execute a screen reader application announcing text output by the first application;
    receive a plurality of end user interactions with the first application executing on the computer program product, wherein the screen reader application announces the end user interactions;
    determine, as the end user interactions are received, a current context for input received by the computer program product and a current technological task of an end user providing the end user interactions, wherein sequential ones of the current context form a current context stream of contexts and end user interactions, and wherein the current context stream is stored in the buffer of the screen reader application from which the announcements are output;
    identify, from the end user interactions, a change in a cognitive state of the end user, where the cognitive states are detected upon determining respective indications in the end user interactions;
    identify a plurality of user experiences corresponding to the change in the cognitive state of the end user and the current context;
    select at least one of the user experiences according to a selection parameter for determining a selected user experience; and
    inject the selected user experience into the current context stream stored in the buffer, wherein the screen reader announces the selected user experience within the current context stream.

2. The computer program product of claim 1, wherein the injection of the selected user experience is a textual input into the current context stream stored in the buffer of the screen reader application.

3. The computer program product of claim 2, further comprising an audio output device, wherein the program instructions executable by the processor further cause the processor:
    operate the screen reader application to announce a first audio reading corresponding to the current context of the current context stream using the audio output device;
    operate the screen reader application to pause the current context stream including the first audio reading corresponding to the current context using the audio output device; and
    operate the screen reader application to announce a second audio reading, during the pause in the first audio reading, corresponding to the textual input using the audio output device.

4. The computer program product of claim 3, wherein the program instructions executable by the processor further cause the processor to distinguish the first audio reading from the second audio reading using a parameter of the screen reader application.

5. The computer program product of claim 3, wherein the parameter of the screen reader application controls a voice characteristic of the screen reader application reading.

6. The computer program product of claim 3, wherein the parameter of the screen reader application controls one or more of a speed and a tone of the screen reader application reading.

7. The computer program product of claim 1, wherein in identifying the plurality of user experiences corresponding to the change in the cognitive state of the end user, the program instructions executable by the processor further cause the processor to:

access a social network of users; and filter a plurality of available user experiences using the change in the cognitive state of the end user to determine a plurality of potential user experiences.

8. The computer program product of claim 7, wherein in selecting the at least one of the user experiences according to the selection parameter for determining the selected user experience, the program instructions executable by the processor further cause the processor to:

determine the selecting parameter corresponding to the end user; and apply the selection parameter to the plurality of potential user experiences to determine the selected user experience.

9. A computer system configured to provide guidance in connection with a technological task, the computer system comprising:

a memory storing program instructions of a cognitive monitor, the program instructions embodying:

a context module configured to receive a plurality of end user interactions with the computer system and to determine, as the end user interactions are received, a current context for input received by the computer system and the technological task of an end user providing the end user interactions, wherein sequential ones of the current context form a current context stream of contexts and end user interactions, and wherein the current context stream is stored in a buffer of the cognitive monitor;

a cognitive state module configured to identify, from the end user interactions, a change in a cognitive state of the end user, where the cognitive states are detected upon determining respective indications in the end user interactions;

a database query module configured to interface with a database and to identify a plurality of user experiences in the database corresponding to the change in the cognitive state of the end user and the current context;

an experience selection module configured to select at least one of the user experiences according to a selection parameter for determining a selected user experience; and an injection module configured to inject the selected user experience into the current context stream stored in the buffer, wherein the injection of the selected user experience is a tangible output of the computer system capable of being perceived by the end user; and a processor configured to execute the program instructions of the cognitive monitor.

10. The computer system of claim 9, wherein the processor is configured to execute an application facilitating the technological task of the user, and a screen reader outputting an audio based interface of the application, the computer system further comprising an audio output device, wherein the injection of the selected user experience is an audio output of the selected user experience, and wherein the injection of the selected user experience is an audio output of the selected user experience augmenting the audio based interface of the screen reader.

* * * * *